United States Patent Office 2,819,970
Patented Jan. 14, 1958

2,819,970
FOOD PRODUCT AND PROCESS

Albert E. Steigmann, Stoneham, Mass., assignor to General Foods Corporation, White Plains, N. Y., a corporation of Delaware No Drawing. Application October 6, 1955
Serial No. 539,010

14 Claims. (Cl. 99—130)

This invention relates to an improved gelatin composition and particularly to gelatin having improved dispersibility in water.

Powdered gelatin is a well known article of commerce. Because the gelatin is essentially insoluble in cold water, its solution usually requires the use of hot water. This is particularly disadvantageous where the gelatin is employed as a gelling agent as with gelatin jelly compositions, since the water employed must first be heated to dissolve the gelatin and then cooled for gelation to occur.

Methods have been devised which improve the intrinsic cold water solubility of gelatin, but it has not been possible heretofore to take full advantage of this improved solubility because of the problems of clumping and foaming attending their use. Futhermore, on attempting to disperse the cold water soluble gelatin by mechanical stirring, an excessive amount of air is incorporated into the solution resulting in foaming and a hazy gel.

These processes for preparing cold water soluble gelatin vary widely but generally provide drying conditions which preserve the gelatin in a molecularly dispersed, amorphous form rather than the usual crystalline form. This is brought about by drying a solution of gelatin from a sol state without passing through a gelled state. In order to assure that the gelatin will remain in a sol state until drying is completed, it is generally necessary to dry a relatively dilute solution in a thin film and to carry out the drying at a temperature above that at which gelation will occur, viz., about 40° C. or higher. Spray drying, drum drying or precipitation of the gel from solution by adding a hot solvent are suitable methods of preparing amorphous gelatin. Furthermore, as the orientation of gelatin molecules in solution to form a gel takes place over a considerable time interval at lower temperatures, rapid drying processes such as freeze drying may be employed to improve the cold water solubility of the gelatin.

In order to realize the maximum benefit of the improvement in cold water solubility thus obtained, it is generally desirable to reduce amorphous gelatin to a fine particle size. But the small particle size together with the improved cold water solubility characteristics aggravates the aforementioned problems of clumping and foaming so that while the amorphous gelatin is intrinsically soluble in cold water, the presence of these problems greatly restricts its usefulness.

It has now been found that a readily dispersible, amorphous gelatin composition substantially free from clumping and foaming when dissolved in cold water is provided by coating comminuted amorphous gelatin with a dispersant. The dispersant may be any one of many surface active agents which promote dispersibility and prevent foaming of materials in aqueous solution.

Examples of suitable dispersants include the silicones, which are organic compounds containing silicon and are of many types. The preferred silicones are mixtures of alkyl di- and/or trichlorosilanes. It is thought that when coated on the gelatin, these materials react with the moisture present in the gelatin to form a hydrophobic skin of alkyl polysiloxane. Other silicones such as alkoxy silanes or their mixtures of the general formulae $(R_2SiO)_n$ and $[(RO)_2SiO]_n$, respectively, are suitable and may also be employed.

Another group of effective dispersants are the esters of polyhydric alcohols and fatty acids such as glycerol monostearate, glycerol monolaurate, propylene glycol monostearate, polyethylene glycol monolaurate, polyethylene glycol monostearate, and the like. Also, the fatty acid esters of sorbitan, the polyoxyethylene derivatives of the sorbitan esters, the polyoxyethylene derivatives of sorbitan, and the polyoxyethylene derivatives of fatty acids, including such materials as polyoxyethylene sorbitans, sorbitan trioleate, sorbitan monolaurate, polyoxyethylene sorbitan monolaurate, polyoxyethylene sorbitan monostearate, polyoxyethylene sorbitan monooleate, polyoxyethylene stearate, polyoxyethylene propylene glycol monostearate, and the like are particularly effective.

Also, the fatty acid amides including stearamides as described in U. S. 1,892,857 and the trialkylphosphates such as tributyl phosphate have been found to be suitable coating agents.

Also effective are the sulfated monoglycerides of fatty acids, and the sulfated partial esters of fatty acids and polyhydric alcohols such as glycerides, glycols, hexitols, and the like, and their alkali or amine salts. Among these materials are included the sodium salts of sulfated glycerol monostearate, monooleate and monopalmitate, as well as salts of sulfated mixtures of monoglycerides such as those derived from coconut oil and lard.

Also, sulfuric acid esters of hydroxy carboxylic acids esterified with higher fatty alcohols, such as sulfated octadecyl lactate; and sulfated, acylated tartaric acid or other polyhydroxy carboxylic acids such as are described in U. S. 2,285,773 are effective, as well as the sulfated tetrahydrofurfuryl esters of fatty acids, described in U. S. 2,253,534. Also, octyl alcohol, cetyl alcohol, and stearyl alcohol are good dispersants.

Similarly, cationic wetting agents such as cetyltrimethylammonium bromide; the sulfonium sulfates of U. S. 2,193,963; condensation products of stearylamine and ethyl metaphosphate; fatty amines and their corresponding quaternary ammonium compounds, e. g. lauryl tri methyl ammonium bromide, with 8–18 carbon atoms in a straight chain and their corresponding salts; ethomeens, which have the general formula

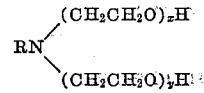

where R is a long chain radical and x and y are integers; oleyl hydroxyethyl imidazoline; and the condensation products of Schiff's bases of higher fatty amines with aldoses, are effective.

Also effective are the metal salts of substituted quaternary hydroxy-cycloimidinic acid metal alcoholates, described in U. S. 2,528,378; condensation products of amino acids or peptides with acid chloride, fatty acid chlorides, or sulfonyl chlorides; condensation products of carbamyl chlorides with amino acids, protein hydrolysates and proteins; condensation products of alkylchloro formates with amino acids, protein hydrolysates and proteins; alkali or amine salts of cholic acid; sulfated sterols; water soluble naphthenates; dodecylsulfate, cetylsulfate, and sulfated olefins; alkali and amine soaps, such as mono-triethanolamine soaps; sulfonated wetting agents such as di-isobutylsulfosuccinate, dioctylsulfosuccinate, and condensation products of the sulfuric ester of ethanolamine with stearic acid or coconut fatty acid chlorides or with caprylic and capric acid; and the high molecular weight polyethylene glycols, commonly termed "Carbowaxes."

Suitable combinations of the materials listed above, may also, of course, be employed.

The level at which these dispersants are employed depends on the surface active properties of the dispersant, on the method of combining the dispersant and gelatin, and on the intended use of the gelatin composition. Many of these materials are largely insoluble in water and when employed according to this invention, are found in a finely dispersed state throughout the prepared gel. It is therefore generally advisable to avoid a high concentration of these materials, the same generally causing haziness in the gel. For some uses, however, such as in salads, jellied fruit juices, etc., the haziness is not objectionable and high levels of materials may be employed if desired. Where water soluble dispersants are employed, haziness is not generally a problem, and a level consistent with edibility and economy is generally used.

The use of these materials prevents the clumping of the gelatin when placed in cold water, and in the event of mechanical mixing or agitation, prevents any tendency to foam. Thus, the compositions of this invention provide a composition wherein the intrinsic cold water solubility of the amorphous gelatin is realized to the fullest extent.

This is particularly advantageous where the amorphous gelatin is used with cold water in preparing jelly desserts, salads, and the like. The ability to use cold water in the preparation of such jellied food products makes for greater convenience in their preparation, particularly from the standpoint of the time required for such preparations. The use of cold water instead of the hot water usually employed in making such jellied products permits the jellied product to be obtained in as little as 60–80 minutes as compared with 120–150 minutes usually required when hot water is employed. In addition, the use of ice cubes to rapidly lower the temperature of the solution results in formation of a gel within 10–15 minutes.

The dispersant may be added directly to comminuted amorphous gelatin and thoroughly mixed as by agitating, milling or grinding to provide the uniform mixing and coating desired. Ordinarily the dispersant is more conveniently mixed with a small amount of gelatin and the gelatin thus coated is in turn mixed with a larger quantity of gelatin to provide gelatin particles coated with the desired dispersant concentration.

Alternatively, the dispersant may be dissolved in an appropriate solvent. The nature of the solvent will depend on the nature of the dispersant and on the facility with which it is removed from the gelatin. The solution of solvent and dispersant is added directly to or sprayed onto the comminuted gelatin with accompanying mixing to provide the desired coating. Where the solution is added directly to small amounts of the comminuted gelatin, it is convenient to porvide uniform dispersion by grinding the mixture. The solvent may be evaporated by contact with warm air, as shown for example in Example 4.

Suspending or dissolving the dispersant in a gelatin solution prior to drying in lieu of coating the comminuted gelatin particles will provide some benefit. In the case of water soluble dispersants, such as the carbowaxes, good results are obtained by this procedure. This procedure, however, does not make efficient use of the water insoluble dispersants, and much higher levels of dispersant are required in this case to provide optimum results.

In gelatin compositions containing sugar, the preferred process of the invention involves the addition of dispersant to a small amount of the total sugar required, followed by thorough mixing therewith. This dispersant-coated sugar is then mixed with a larger portion of sugar. The latter dispersant-sugar mixture is thoroughly agitated or ground to provide a uniform mixing of dispersant throughout the sugar. In the third step, the latter dispersant sugar mixture is added to an equal quantity by weight of gelatin, and the whole is mixed, preferably by grinding, to provide a master mix with which additional quantities of sugar and other components such as buffer salts, fruit acid flavor, color, and the like, may be added to provide a complete jelly mix.

As aforementioned, the use of dispersants with gelatin having a high degree of intrinsic cold water solubility is particularly beneficial in gelatin dessert products. In this case, best results have been obtained with the water soluble carbowaxes and with the water insoluble polyoxyethylene sorbitan and polyoxyethylene sorbitan monooleate. Because of this, and because of their ready availability, these materials are generally preferred.

The following specific examples will serve to illustrate the preferred embodiments of this invention.

*Example 1*

Amorphous gelatin which is intrinsically cold water soluble is prepared in the following manner. A 15% solution of 250 Bloom acid extracted gelatin is prepared and maintained at 50° C. The solution is then fed to a Buflovak drum dryer of the atmospheric type, manufactured by the Blaw-Knox Company, Buffalo, New York. The drier is operated at a temperature equivalent to steam under the pressure of 15 lbs. per sq. inch gage. The doctor blade of the drier is adjusted to remove the gelatin immediately after drying is completed. The dried product is removed from the drum and ground to a particle size of through 60 but on 70 standard mesh screen.

*Example 2*

100 lbs. of amorphous comminuted drum-dried gelatin and .3 lb. of DC Anti-Foam A, a silicone mixture containing methyl polysiloxane, manufactured by the Dow Corning Corporation, Midland, Michigan, is ground in a ball mill for several minutes, providing a uniform coating of the silicone on the gelatin particle.

*Example 3*

100 lbs. of amorphous spray dried gelatin containing 1% moisture is mixed with or exposed to the fumes of .3 lb. of an alkyl trichlorosilane. The gelatin mixture is tumbled briefly in a ball mill to assure uniform distribution.

*Example 4*

50 lbs. of sugar is thoroughly mixed with a dispersion of .3 lb. of DC Anti-Foam A wax in 3 lbs. of polyoxyethylene sorbitan mono-oleate. This mixture is then combined with 17 lbs. of isopropyl alcohol and vigorously shaken. The whole is then sprayed onto 1000 lbs. of comminuted amorphous gelatin and thoroughly mixed to insure uniform distribution. The gelatin is then dried in a current of warm air to remove the solvent.

*Example 5*

100 lbs. of amorphous comminuted drum-dried gelatin are thoroughly mixed with 1 lb. of polyoxyethylene sorbitan (G–2320, manufactured by the Hercules Powder Company, Wilmington, Delaware) dissolved in 95% ethyl alcohol. The mixture is then ground in a ball mill for several minutes until the solvent is evaporated and the gelatin particles are uniformly coated with the dispersant.

*Example 6*

100 lbs. of amorphous comminuted drum-dried gelatin are thoroughly mixed with 1 lb. of polyoxyethylene sorbitan monooleate (Tween 80, manufactured by the Hercules Powder Company, Wilmington, Delaware) dissolved in 95% ethyl alcohol. The mixture is then ground in a ball mill for several minutes until the solvent is evaporated and the gelatin particles are uniformly coated with the dispersant.

Example 7

100 lbs. of 250 Bloom acid extracted gelatin is dissolved in sufficient water to make a 15% solution. The solution is maintained at a temperature above 45° C. and 1.5 lbs. of high molecular weight polyethylene glycol (Carbowax 6000, manufactured by Carbide & Carbon Chemical Company, 30 East 42nd St., New York, N. Y.), are dissolved in the gelatin solution with appropriate mixing. The solution is then fed to a Buflovak drum dryer of the atmospheric type. The drier is operated at an internal drum temperature equivalent to steam under 15 lbs. per sq. in. gage. The doctor blade is adjusted to remove the gelatin after drying is completed. The dried product is removed and ground to a particle size of through 60 but on 70 standard mesh screen. The resulting product is then ready for use in a gelatin dessert product.

Example 8

Suitable gelatin jelly compositions which are dispersible and soluble in cold water and which are free from clumping and foaming may be prepared by employing the gelatin made according to Examples 2–7 above in the following formula. Where sugar has been included in preparing the coated gelatin sample, a corresponding reduction may be made in the sugar content of the composition.

| Ingredient: | Quantity (gms.) |
| --- | --- |
| Gelatin | 10 |
| Sucrose | 75 |
| Citric acid | 2.48 |
| NaCl | 0.43 |
| $NaH_2PO_4$ | 0.215 |
| $Na_2HPO_4$ | 0.215 |

In using the above composition to make a dessert gel, 473 cc. of water at room temperature (70° F.) are added to the dry mixture with a slight amount of stirring. The composition is completely dissolved within 2 minutes to provide a clear, substantially foam-free solution. On refrigeration the solution sets within 60–80 minutes to provide a completely gelled dessert.

While the benefits of this invention have been described with particular reference to cold water soluble gelatin when used in gelatin desserts, it is to be recognized that the invention is not so restricted, but that the gelatin thus improved may be employed to advantage in a multitude of compositions. It will also be understood that while the invention has been described in part by means of specific examples, reference should be had to the appended claims for a definition of the scope of the invention.

What is claimed is:

1. A dry, cold water soluble gelatin composition comprising amorphous gelatin coated with dispersant.
2. A dry, cold water soluble gelatin composition comprising a mixture of sugar and comminuted amorphous gelatin coated with a dispersant.
3. The product of claim 1 wherein the dispersant is a silicone.
4. The product of claim 1 wherein the dispersant is a high molecular weight polyethlyene glycol.
5. The product of claim 1 wherein the dispersant is a polyoxyethylene derivative of a fatty acid ester of sorbitan.
6. The product of claim 1 wherein the dispersant is a polyoxyethylene derivative of sorbitan.
7. The product of claim 1 wherein the dispersant is an ester of a polyhydric alcohol and a fatty acid.
8. A dry, cold water soluble gelatin dessert product comprising comminuted amorphous gelatin, a dispersant, sugar, a fruit acid, and buffer salts sufficient to adjust the pH of the composition on solution in water to about 3.3, said dispersant being coated on said gelatin.
9. The product of claim 8 wherein the dispersant is a silicone.
10. The product of claim 8 wherein the dispersant is a high molecular weight polyethylene glycol.
11. The product of claim 8 wherein the dispersant is a polyoxyethylene derivative of a fatty acid ester of sorbitan.
12. The product of claim 8 wherein the dispersant is a polyoxyethylene derivative of sorbitan.
13. The product of claim 8 wherein the dispersant is an ester of a polyhydric alcohol and a fatty acid.
14. A process for preparing an improved dry, comminuted, amorphous, cold water soluble gelatin composition comprising the step of coating comminuted amorphous gelatin wtih a dispersant.

References Cited in the file of this patent

UNITED STATES PATENTS

| | | |
| --- | --- | --- |
| 1,929,732 | Zeigler | Oct. 10, 1933 |
| 1,995,281 | Epstein | Mar. 19, 1935 |
| 2,535,538 | Koch | Dec. 26, 1950 |
| 2,611,708 | Owens et al. | Sept. 23, 1952 |